(12) United States Patent
Uchimoto

(10) Patent No.: US 10,951,062 B2
(45) Date of Patent: Mar. 16, 2021

(54) WIRELESS POWER RECEIVER APPARATUS

(71) Applicant: ROHM CO., LTD., Kyoto (JP)

(72) Inventor: Daisuke Uchimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 293 days.

(21) Appl. No.: 16/015,763

(22) Filed: Jun. 22, 2018

(65) Prior Publication Data

US 2018/0301943 A1    Oct. 18, 2018

Related U.S. Application Data

(63) Continuation of application No. PCT/JP2016/085110, filed on Nov. 28, 2016.

(30) Foreign Application Priority Data

Dec. 25, 2015 (JP) .............................. JP2015-254125

(51) Int. Cl.
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 50/10* (2016.02); *H02J 50/80* (2016.02);
(Continued)

(58) Field of Classification Search
USPC ........................................................ 307/104
See application file for complete search history.

(56) References Cited

U.S. PATENT DOCUMENTS

| 5,838,175 A * | 11/1998 | Hsieh .................... G11C 27/026 327/94 |
| 2014/0015331 A1* | 1/2014 | Kim ...................... H04B 5/0037 307/104 |
| 2017/0033608 A1* | 2/2017 | Bunsen ................... H02J 50/12 |

FOREIGN PATENT DOCUMENTS

| JP | 2013038854 A | 2/2013 |
| JP | 2014107971 A | 6/2014 |

(Continued)

OTHER PUBLICATIONS

International Search Report corresponding to Application No. PCT/JP2016/085110; dated Jan. 31, 2017.
(Continued)

*Primary Examiner* — Rexford N Barnie
*Assistant Examiner* — Xuan Ly
(74) *Attorney, Agent, or Firm* — Cantor Colburn LLP

(57) ABSTRACT

A rectifier circuit rectifies the current that flows through a reception coil. A smoothing capacitor is coupled to the output of the rectifier circuit. A power supply circuit stabilizes the rectified voltage $V_{RECT}$ that occurs across the smoothing capacitor, and supplies the rectified voltage thus stabilized to a load. A dump circuit sinks the first dump current $I_{DUMP}$ from the output of the power supply circuit. A current detection circuit detects the current $I_{OUT}$ that flows through the power supply circuit, and generates a current detection signal S11 that indicates the amount of the current.

15 Claims, 7 Drawing Sheets

(51) Int. Cl.
*H02M 1/14* (2006.01)
*H02J 50/80* (2016.01)
*H02J 50/10* (2016.01)
*H02M 3/155* (2006.01)
*H04B 5/00* (2006.01)
*H02M 1/00* (2006.01)
*H01Q 1/24* (2006.01)

(52) U.S. Cl.
CPC ........... *H02M 1/143* (2013.01); *H02M 3/155* (2013.01); *H04B 5/0031* (2013.01); *H04B 5/0037* (2013.01); *H04B 5/0081* (2013.01); *H01Q 1/248* (2013.01); *H02M 2001/0009* (2013.01)

(56) References Cited

FOREIGN PATENT DOCUMENTS

| JP | 2014220984 A | 11/2014 |
|----|--------------|---------|
| WO | 2013011906 A1 | 1/2013 |

OTHER PUBLICATIONS

Written Opinion of the International Searching Authority and International Preliminary Report on Patentability corresponding to Application No. PCT/JP2016/085110; dated Jan. 31, 2017.

\* cited by examiner

324a

WIRELESS POWER RECEIVER APPARATUS

CROSS REFERENCE TO RELATED APPLICATIONS

This application is a bypass continuation under 35 U.S.C. § 120 of PCT/JP2016/085110, filed Nov. 28, 2016, which is incorporated herein reference and which claimed priority to Japanese Application No. 2015-254125, filed Dec. 25, 2015. The present application likewise claims priority under 35 U.S.C. § 119 to Japanese Application No. 2015-254125, filed Dec. 25, 2015, the entire content of which is also incorporated herein by reference.

FIELD OF THE INVENTION

The present invention relates to a wireless power supply technique.

DESCRIPTION OF THE RELATED ART

In recent years, as a power supply method for supplying electric power to an electronic device, a wireless power supply method has been becoming popular. Such a wireless power supply method can be classified into two methods, i.e., the magnetic induction (MI) method and the magnetic resonance (MR) method. At present, as the MI method, (1) the "Qi" standard developed by the WPC (Wireless Power Consortium) and (2) the standard developed by the PMA (Power Matters Alliance) (which will be referred as the "PMA standard" hereafter) have become mainstream.

FIG. 1 is a diagram showing a configuration of a wireless power supply system 100R that conforms to the PMA standard. The wireless power supply system 100R includes a power transmitter (TX) apparatus 200R and a power receiver (RX) apparatus 300R. The power receiver apparatus 300R is mounted on an electronic device such as a cellular phone terminal, a smartphone, an audio player, a game machine, a tablet terminal, etc.

The power transmitter apparatus 200R includes a transmission coil (primary coil) 202, a driver 204, a controller 206, and a demodulator 208. The driver 204 includes an H-bridge circuit (full bridge circuit) or otherwise a half bridge circuit. The driver 204 applies a driving signal S1, and specifically, which is configured as an AC driving signal, to the transmission coil 202. In this state, a driving current flows through the transmission coil 202. As a result, the transmission coil 202 generates an electric power signal S2 configured as an electromagnetic field signal. The controller 206 integrally controls the overall operation of the power transmitter apparatus 200R. Specifically, the controller 206 controls the switching frequency of the driver 204, or otherwise the duty ratio or the phase of the switching operation thereof, so as to change the electric power to be transmitted.

The power receiver apparatus 300R includes a reception coil 302, a rectifier circuit 304, a smoothing capacitor 306, a power supply circuit 308, a modulator 310, and a controller 312. The reception coil 302 receives the electric power signal S2 from the transmission coil 202. Furthermore, the reception coil 302 transmits a control signal S3 to the transmission coil 202. The rectifier circuit 304 and the smoothing capacitor 306 rectify and smooth a current $I_{RX}$ induced at the reception coil 302 according to the electric power signal S2, thereby converting the current $I_{RX}$ into a DC voltage $V_{RECT}$.

The power supply circuit 308 steps up or otherwise steps down the DC voltage $V_{RECT}$, and supplies the DC voltage stepped up or down to the controller 312 or other loads 380. Also, such loads 380 may include a secondary battery. Also, the power supply circuit 308 may include a charger that charges the secondary battery.

In the PMA standard, a communication protocol is defined for communication between the power transmitter apparatus 200R and the power receiver apparatus 300R. Such a communication protocol allows the power receiver apparatus 300R to transmit information to the power transmitter apparatus 200R in the form of the control signal S3. The control signal S3 is transmitted from the power reception coil 302 (secondary coil) to the transmission coil 202 in the form of an FSK (Frequency Shift Keying) modulated signal or otherwise an ASK (Amplitude Shift Keying) modulated signal using backscatter modulation.

The control signal S3 includes electric power control data (which will also be referred to as a "packet") which controls an amount of electric power to be supplied to the power receiver apparatus 300R, data which indicates the identifying information for the power receiver apparatus 300R, etc. The demodulator 208 demodulates the control signal S3 included in the current or otherwise the voltage applied to the transmission coil 202. The controller 206 controls the driver 204 based on the electric power control data included in the control signal S3 thus demodulated.

A light load state or a non-load state can occur in which the load current (output current of the power supply circuit 308) $I_{OUT}$ supplied to the load 380 falls. In these states, the current $I_{RECT}$ that flows from the rectifier circuit 304 to the load side falls. In some cases, this leads to the operation of the power supply system 100R becoming unstable. Specifically, if the load current $I_{OUT}$ (rectified current $I_{RECT}$) becomes excessively small under a condition that the transmitted power is maintained at a constant level, this leads to the rectified voltage $V_{RECT}$ having a very large value. Alternatively, in a case in which a synchronous rectification circuit (H-bridge circuit) is employed as the rectifier circuit 304, if the output current $I_{RECT}$ of the rectifier circuit 304 becomes excessively small, this leads to the switching control operation of the H-bridge circuit becoming unstable. In order to solve this problem, a dump resistor $R_{DUMP}$ is coupled to the output of the rectifier circuit 304. In the light load state or otherwise in the non-load state, the resistance value of the dump resistor $R_{DUMP}$ is reduced such that the dump current represented by Expression (1) is drawn to the ground. This prevents the rectifier circuit 304 from becoming the non-load state, thereby securing the stability of the circuit operation.

$$I_{DUMP} = V_{RECT}/R_{DUMP} \tag{1}$$

As a result of investigating the power receiver apparatus 300R shown in FIG. 1, the present inventor has come to recognize the following problem.

In the wireless power supply, the received power $P_{RX}$ is calculated by the power receiver apparatus 300R. The received power $P_{RX}$ can be used in foreign object detection (FOD), transmitted power control operation, etc.

In this case, it is needless to say that the received power $P_{RX}$ includes the consumed power $P_{DUMP}$ that occurs at the dump resistor $R_{DUMP}$, which can be calculated based on Expression (2). In this calculation, the measurement value or otherwise the target value thereof may be employed as $V_{RECT}$.

$$P_{DUMP} = V_{RECT}^2/R_{DUMP} \tag{2}$$

Here, the resistance value of the resistor $R_{DUMP}$ has process variation and temperature dependence. Accordingly, in a case in which the design value of the resistor $R_{DUMP}$ is used in the calculation represented by Expression (2), this leads to calculation error between the electric power $P_{DUMP}$ thus calculated based on Expression (2) and the actual electric power.

In addition to such a demand for measuring the received power $P_{RX}$, in some cases, there is a demand for measuring, with high precision, the current $I_{RECT}$ that flows from the rectifier circuit 304 to the load side in order to reflect the measurement results in the control operation. The current $I_{RECT}$ is the sum total of the current $I_{IN}$ that flows to the power supply circuit 308 and the dump current $I_{DUMP}$. The dump current $I_{DUMP}$ is represented by Expression (1). Accordingly, if the resistance value has variation, this leads to error in the calculation of the current amount of the dump current $I_{DUMP}$.

SUMMARY OF THE INVENTION

The present invention has been made in order to solve such a problem. Accordingly, it is an exemplary purpose of an embodiment of the present invention to provide a power receiver apparatus that is capable of detecting the current that flows in the circuit or otherwise consumed power (received power) thereof with high precision.

An embodiment of the present invention relates to a wireless power receiver apparatus. The wireless power receiver apparatus comprises: a reception coil, a rectifier circuit structured to rectify a current that flows through the reception coil; a smoothing capacitor coupled to an output of the rectifier circuit; a power supply circuit structured to receive a rectified voltage across the smoothing capacitor, and to supply a stabilized voltage to a load; a dump circuit structured to sink a first dump current from an output of the power supply circuit; and a current detection circuit structured to detect a current that flows through the power supply circuit, and to generate a current detection signal that indicates an amount of the current thus detected.

The current that flows through the power supply circuit includes the first dump current in addition to the load current. Accordingly, the current detection signal is generated giving consideration to the dump current. With this embodiment, this arrangement is capable of detecting the current that flows from the rectifier circuit to the load side with high precision. Accordingly, this arrangement is capable of detecting the consumed electric power (received electric power) with high precision.

In a case in which a regulator with a feedback control operation is employed as the power supply circuit, this arrangement has a problem in that the oscillation margin becomes small in the light load state or non-load state. Accordingly, it is difficult to design the feedback loop for phase compensation or the like. Otherwise, this leads to degradation in the stability of the system. In order to solve such a problem, the first dump current constitutes the minimum load of the power supply circuit. This allows the feedback loop to be designed in a simple manner. Alternatively, this allows the stability of the system to be dramatically improved.

Also, the dump circuit may be structured to allow a second dump current to sink from an input of the power supply circuit in addition to the first dump current.

Also, the dump circuit may sink the second dump current before completion of a startup operation of the power supply circuit. Also, the dump circuit may sink the first dump current after the completion of the startup operation of the power supply circuit.

In a state in which the output voltage of the power supply circuit is excessively low, a sufficient amount of the first dump current cannot sink. Alternatively, in a case in which the first dump current sinks in such a state in which the output voltage is excessively low, this has the potential to cause the occurrence of inrush current. In order to solve such a problem, before the completion of the startup operation of the power supply circuit, this arrangement sinks the dump current from the upstream side of the power supply circuit. This allows a necessary amount of dump current to flow even in a state in which the output voltage of the power supply circuit is excessively low, thereby allowing the circuit operation to be stabilized.

Also, the wireless power receiver apparatus according to an embodiment may further comprise an electric power measurement unit structured to calculate a received electric power based on at least the current detection signal.

Also, the wireless power receiver apparatus according to an embodiment may further comprise: a target voltage setting unit structured to control a target value of the rectified voltage based on the current detection signal; an electric power control unit structured to generate electric power control data having a value that is adjusted such that the rectified voltage approaches the target value; and a modulator structured to modulate the electric power control data, and to supply the electric power control data thus modulated to a wireless power transmitter apparatus via the reception coil.

Also, the dump circuit may raise the first dump current according to a reduction in the current that flows through the power supply circuit. This allows the consumed power of the dump circuit to be maintained at a substantially constant level.

Also, the dump circuit may comprise a first current source coupled to the output of the power supply circuit and structured to generate the first dump current. Also, the dump circuit may comprise a second current source coupled to the input of the power supply circuit and structured to generate the second dump current.

By generating the dump current by means of the current source instead of the resistor, this arrangement provides the dump current with improved precision as compared with an arrangement in which the dump circuit is configured using a resistor element.

Also, the dump circuit may comprise: a first transistor arranged such that a first terminal thereof is coupled to the output of the power supply circuit; a feedback resistor arranged between a second terminal of the first transistor and a ground; a second transistor arranged such that a first terminal thereof is coupled to the input of the power supply circuit and a second terminal thereof is coupled to the feedback resistor; and an error amplifier structured to adjust voltages applied to control terminals of the first transistor and the second transistor.

This arrangement requires only a single error amplifier to stabilize the sum total of the first dump current and the second dump current to a value that corresponds to the control voltage. This allows the number of circuit elements to be reduced.

Also, the dump circuit may further comprise: a first switch arranged between the control terminal of the first transistor and the error amplifier; and a second switch arranged between the control terminal of the second transistor and the error amplifier.

This arrangement is capable of independently turning on and off the first dump current and the second dump current according to the ON/OFF states of the first switch and the second switch.

Also, the dump circuit may further comprise a variable voltage source structured to generate the control voltage according to the current detection signal.

Also, the variable voltage source may comprise: a constant voltage source structured to generate a constant voltage; a voltage dividing circuit comprising multiple resistors coupled in series between an output of the constant voltage source and the ground; multiple switches respectively arranged between multiple taps provided to the voltage dividing circuit and an input terminal of the error amplifier; and a decoder structured to control the multiple switches according to the current detection signal.

Also, the constant voltage source may comprise a repair resistor structured to allow the constant voltage to be adjusted in a manufacturing step.

Also, the current detection circuit may comprise: a current mirror circuit comprising a third transistor arranged on a path of a current of the power supply circuit to be detected and a fourth transistor arranged such that a control terminal thereof is coupled to a control terminal of the third transistor so as to form a common control terminal; and an I/V converter circuit structured to convert a current that flows through the fourth transistor into a voltage.

Also, the current detection circuit may comprise: a current detection resistor arranged on a path of a current of the power supply circuit to be detected; a sensing amplifier structured to generate a detection signal that corresponds to a voltage drop that occurs across the current detection resistor; and an A/D converter structured to quantize the output signal of the sensing amplifier so as to generate a current detection signal.

Also, the dump circuit may comprise a first dump resistor arranged between the output of the power supply circuit and the ground. Also, the dump circuit may be structured to sink the first dump current in inverse proportion to a resistance value of the first dump resistor. Also, the dump circuit may comprise a second dump resistor arranged between the input of the power supply circuit and the ground. Also, the dump circuit may be structured to sink the second dump current in inverse proportion to a resistance value of the second dump resistor.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

Figure 2:
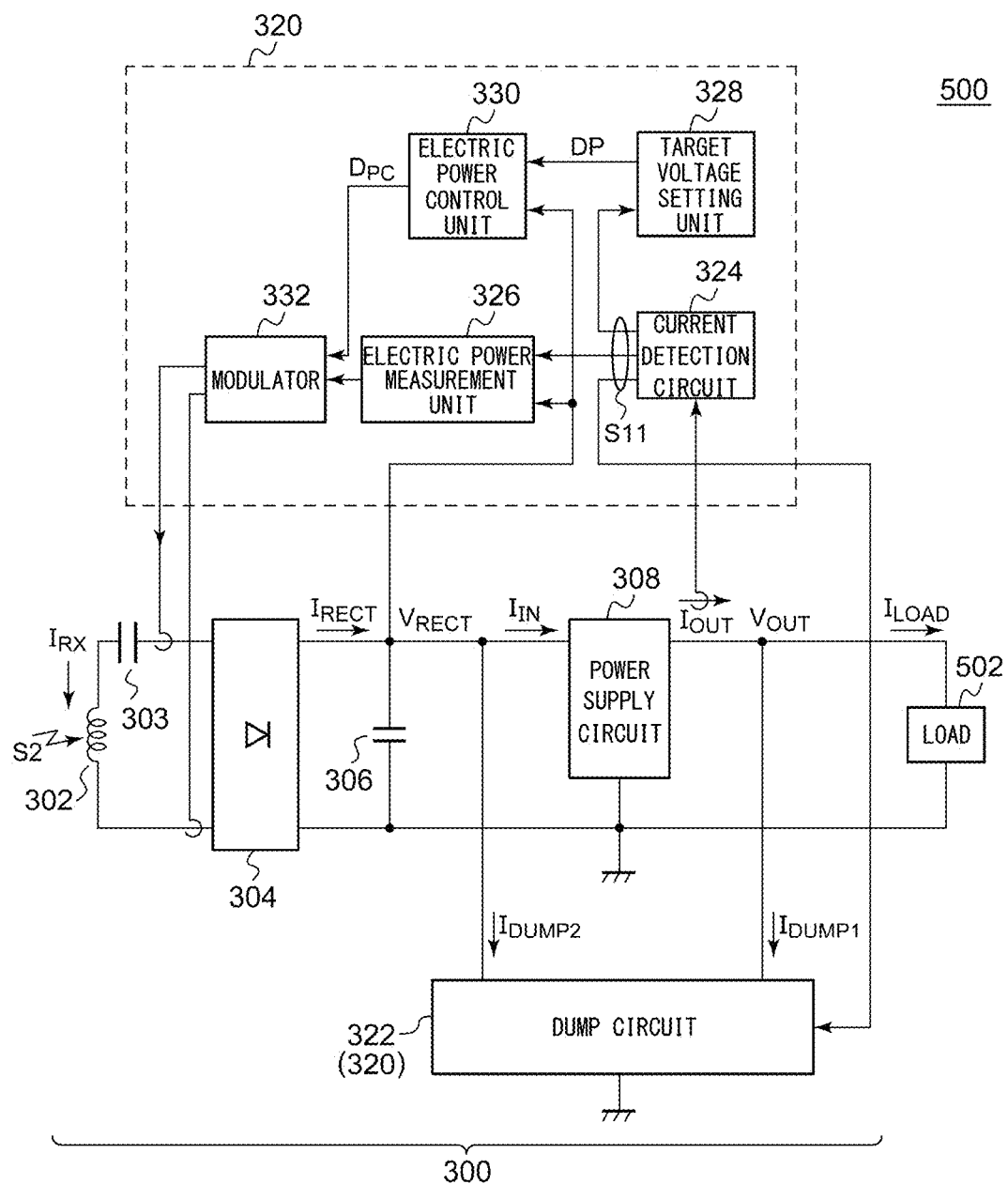
FIG. 2 is a block diagram showing an electronic device including a power receiver apparatus according to an embodiment.

FIG. 2 is a block diagram showing an electronic device 500 including a power receiver apparatus 300 according to an embodiment. The power receiver apparatus 300 receives an electric power signal S2 from an unshown power transmitter apparatus, stores the energy thereof in a smoothing capacitor 306, and supplies the energy to a load 502. The power receiver apparatus 300 conforms to the Qi standard, the PMA standard, or otherwise other standards. Also, the power receiver apparatus 300 may conform to a combination of such multiple standards.

The power receiver apparatus 300 includes a reception coil 302, a resonance capacitor 303, a rectifier circuit 304, a smoothing capacitor 306, a power supply circuit 308, and a controller 320.

The reception coil 302 receives the electric power signal S2 transmitted from the transmission coil, and transmits a control signal S3 to the transmission coil. The resonance capacitor 303 is coupled to the reception coil 302 in series. The reception coil 302 and the resonance capacitor 303 form a reception antenna. A current $I_{RX}$ induced due to the electric power signal S2 flows through the reception coil 302. The input side of the rectifier circuit 304 is coupled to the reception coil 302, and full-wave or half-wave rectifies the current $I_{RX}$. The rectifier circuit 304 may be configured as a diode bridge circuit (diode rectifier circuit) or otherwise an H-bridge circuit (synchronous rectifier circuit). The smoothing capacitor 306 is coupled to the output of the rectifier circuit 102, and smooths the output voltage of the rectifier circuit 102.

It is difficult to directly drive an electronic circuit such as a processor using the rectified voltage $V_{RECT}$. Accordingly, the power supply circuit 308 is provided. The power supply circuit 308 receives the DC voltage (which will be referred to as the "rectified voltage") $V_{RECT}$ generated across the smoothing capacitor 306 and supplies an output voltage stabilized to a predetermined voltage to the load 502. The power supply circuit 308 includes a linear regulator and/or a switching regulator (DC/DC converter), regulates the rectified voltage $V_{RECT}$ to a suitable voltage level, and supplies the voltage thus regulated to the load 502. Also, the power supply circuit 308 may include a charger circuit that charges a secondary battery using the electric power supplied from the power transmitter apparatus 200.

Next, description will be made regarding the controller 320 according to the embodiment. The controller 320 includes a dump circuit 322, a current detection circuit 324, an electric power measurement unit 326, a target voltage setting unit 328, an electric power control unit 330, and a modulator 332. The controller 320 is configured as a function IC in which all or a part of the components thereof are integrated on a single semiconductor substrate. FIG. 2 does not necessarily show all the components of the controller 320. For ease of understanding and for simplicity of description, blocks that have no relation with the present invention are not shown.

With conventional techniques, the dump current sinks from only the input side of the power supply circuit 308. In contrast, with the dump circuit 322 in the present embodiment, a first dump current $I_{DUMP1}$ sinks from the output of the power supply circuit 308. When the load 502 is in the standby state, i.e., when the power receiver apparatus 300 is in the non-load state or the light-load state, the first dump current $I_{DUMP1}$ is generated in order to prevent the output current $I_{RECT}$ of the rectifier circuit 304 from becoming zero.

The current detection circuit 324 detects the current $I_{OUT}$ that flows through the power supply circuit 308, and generates a current detection signal S11 that indicates the current amount.

The dump circuit 322 may control the amount of the dump current $I_{DUMP}$ based on the current amount detected by the current detection circuit 324. Specifically, the dump circuit 322 raises the first dump current $I_{DUMP1}$ according to a reduction in the current $I_{OUT}$ output from the power supply circuit 308.

The electric power measurement unit 326 measures the received power $P_{RX}$ based on at least the current detection signal S11. The modulator 332 may modulate the data that indicates the received power $P_{RX}$, and may transmit the data thus modulated to the power transmitter apparatus via the reception coil 302. The power transmitter apparatus may detect a foreign object based on the relation between the received power $P_{RX}$ and the transmitted power $P_{TX}$ transmitted from the power transmitter apparatus itself.

The target voltage setting unit 328 controls the target value DP (Desired Point) of the rectified voltage $V_{RECT}$. The target voltage setting unit 328 may change the target value REF of the rectified voltage $V_{RECT}$ based on the current detection signal S11. For example, the target voltage setting unit 328 raises the rectified voltage $V_{RECT}$ according to a reduction in the current $I_{OUT}$ ($I_{LOAD}$). This arrangement is capable of suppressing fluctuation of the received power $P_{RX}$ that occurs due to the fluctuation in the current $I_{OUT}$.

The electric power control unit 330 generates electric power control data $D_{PC}$ having a value adjusted such that the measurement value of the rectified voltage $V_{RECT}$ approaches the target value DP. The electric power control unit 330 is provided with different signal processing and a different configuration depending on the standard supported by the power receiver apparatus 300. For example, in a case in which the Qi standard is employed, a control error signal CE that indicates the difference between $V_{RECT}$ and DP is employed as the electric power control data $D_{PC}$. In a case in which the PMA standard is employed, the electric power control data $D_{PC}$ is generated based on a comparison relation between $V_{RECT}$ and the target value DP.

The modulator 332 modulates the electric power control data $D_{PC}$, and transmits the modulated data to the wireless power transmitter apparatus via the reception coil 302.

The dump circuit 322 is configured to allow the second dump current $I_{DUMP2}$ to sink from the input of the power supply circuit 308 in addition to the first dump current $I_{DUMP1}$. The dump circuit 322 sinks the second dump current $I_{DUMP2}$ before the completion of the startup operation of the power supply circuit 308. When the voltage $V_{OUT}$ becomes high to some extent after the completion of the startup operation of the power supply circuit 308, the dump circuit 322 sinks the first dump current $I_{DUMP1}$. The completion of the startup operation may be the time point at which the output voltage $V_{OUT}$ exceeds a predetermined threshold voltage or otherwise the time point at which the output voltage $V_{OUT}$ is stabilized to the target level thereof.

The above is the configuration of the power receiver apparatus 300. Next, description will be made regarding the advantages thereof.

The current $I_{RECT}$ ($I_{OUT}$) that flows from the rectifier circuit 304 to the load is an important parameter to be used in various kinds of uses of the power receiver apparatus 300. Examples of such uses include: measurement of the received electric power, controlling the dump current, controlling the target value DP of the rectified voltage $V_{RECT}$, etc.

With this arrangement, the current $I_{OUT}$ that flows through the power supply circuit 308 includes the first dump current $I_{DUMP1}$ in addition to the load current $I_{LOAD}$. Accordingly, the current detection signal S11 is generated by the current detection circuit 324 giving consideration to the dump current $I_{DUMP1}$.

Figure 1:
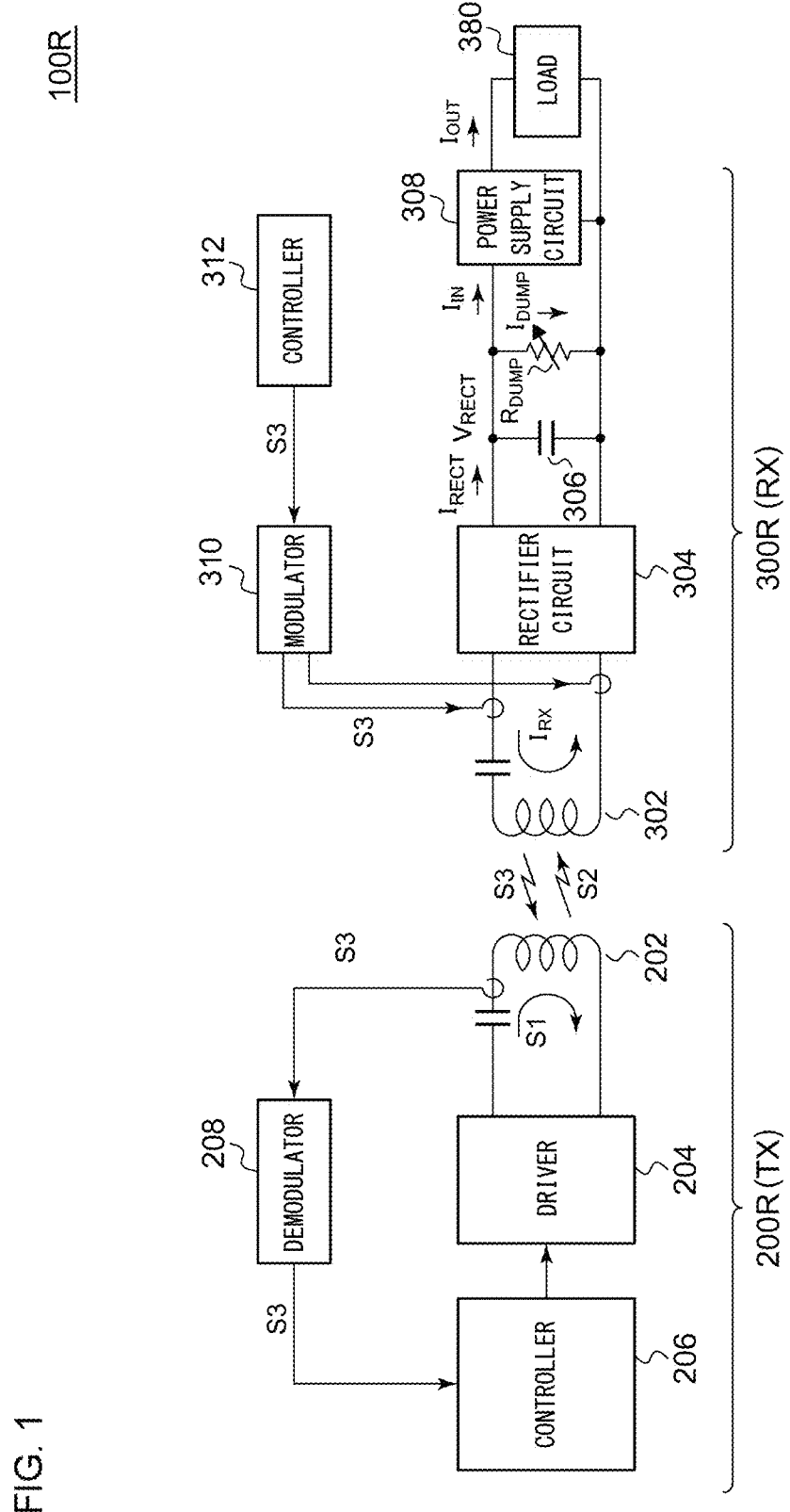
FIG. 1 is a diagram showing a configuration of a wireless power supply system that conforms to the PWM standard.

The power receiver apparatus 300R shown in FIG. 1 is not capable of measuring the dump current $I_{DUMP}$ with high precision. Accordingly, even if the $I_{OUT}$ of the power supply circuit 308 can be measured with high precision, the current $I_{RECT}$ that flows from the rectifier circuit 304 to the load 502 is not calculated with high precision based on the Expression $I_{RECT} = I_{OUT} + I_{DUMP}$. In contrast, with the power receiver apparatus 300 according to the embodiment, the dump current $I_{DUMP1}$ can be measured as a part of the current of the power supply circuit 308. Accordingly, this arrangement is capable of detecting the current $I_{RECT}$ that flows from the rectifier circuit 304 to the load 502 side with high precision.

Furthermore, the current detection signal S11 is used to calculate the received electric power $P_{RX}$ of the power receiver apparatus 300. As a result, the power receiver apparatus 300 is capable of detecting the consumed electric power (received electric power) $P_{RX}$ with high precision as an additional effect of the high-precision measurement of the current $I_{RECT}$. Description will be made regarding this operation.

The electric power measurement unit 326 measures the received electric power $P_{RX}$ based on at least the current detection signal S11. The received electric power $P_{RX}$ is the consumed power of the power receiver apparatus 300. For example, the received electric power $P_{RX}$ is the sum total of the output electric power $P_{RECT}$ of the rectifier circuit 304 and the consumed electric power $P_{DUMP}$ of the dump circuit 322. It should be noted that the received electric power $P_{RX}$ also includes the consumed electric power of the controller 320. However, the consumed electric power of the controller 320 is small as compared with $P_{RECT}$ or $P_{DUMP}$, and is ignored in this calculation.

The output electric power $P_{RECT}$ of the rectifier circuit 304 is approximated by $I_{IN} \times V_{RECT} (\approx I_{OUT} \times V_{RECT})$. Here, the consumed electric power $P_{DUMP1}$ of the dump circuit 322 based on the first dump current $I_{DUMP1}$ is represented by $V_{OUT} \times I_{DUMP1}$. As described above, the first dump current $I_{DUMP}$ is included in the current $I_{OUT}$ of the power supply circuit 308. Thus, $P_{RECT}$ includes $P_{DUMP1}$.

That is to say, when the received electric power $P_{RX}$ is to be measured, the current detection circuit 324 is not required to calculate the term $P_{DUMP1}$ (=$V_{OUT} \times I_{DUMP1}$), and it is sufficient to give consideration to the term $P_{RECT}$ (=$V_{OUT} \times I_{OUT}$). Here, $I_{OUT}$ represented by the current detection signal S11 is measured with high precision. Furthermore, $V_{RECT}$ can be measured with high precision. Accordingly, the power receiver apparatus 300 is capable of measuring the received electric power $P_{RX}$ with high precision.

As the power supply circuit 308, a regulator with a feedback control operation is employed. Such a regulator may be configured as a linear regulator or a switching regulator (DC/DC converter).

With typical regulators, an oscillation margin becomes small in the light load state or non-load state. This leads to a difficulty in designing the feedback loop for phase compensation or the like. Alternatively, this leads to a problem of degradation in the stability of the system. In order to solve this problem, with the power receiver apparatus 300 according to the embodiment, the first dump current $I_{DUMP1}$ functions as the minimum load of the power supply circuit 308. Accordingly, the power receiver apparatus 300 can be designed without giving consideration to the non-load state of the power supply circuit 308. This allows the feedback loop to be designed in a simple manner, or otherwise allows the system stability to be dramatically improved.

With the embodiment, at the time point that defines before and after the completion of the startup operation of the power supply circuit 308, the main path of the dump current $I_{DUMP}$ is switched between the input-side path of the power supply circuit 308 and the output-side path thereof. This arrangement provides the following advantages.

In a state in which the output voltage $V_{OUT}$ of the power supply circuit 308 is excessively low, a sufficient amount of the first dump current $I_{DUMP1}$ cannot sink. Alternatively, in a case in which the first dump current $I_{DUMP1}$ sinks in such a state in which the output voltage $V_{OUT}$ is excessively low, this has the potential to cause inrush current. In order to solve such a problem, before the completion of the startup operation of the power supply circuit, the dump current $I_{DUMP2}$ that flows via the upstream stage of the power supply circuit is used as a sink current. This allows a necessary amount of dump current to flow even in a state in which the output voltage $V_{OUT}$ of the power supply circuit 308 is excessively low, thereby allowing the circuit operation to be stabilized.

In addition, the received electric power $P_{RX}$ to be measured by the electric power measurement unit 326 needs to include the term of the consumed electric power $P_{DUMP2} = V_{RECT} \times I_{DUMP2}$, which occurs based on the second dump current $I_{DUMP2}$. However, in a case in which the second dump current $I_{DUMP2}$ involves a large measurement error, this leads to a large error in the calculation of the term $P_{DUMP2}$. In order to solve this problem, with the power receiver apparatus 300 according to the embodiment, the second dump current $I_{DUMP2}$ flows as a sink current only before the completion of the startup operation of the power supply circuit 308. Accordingly, assuming that $I_{DUMP2}$=0, the term $P_{DUMP2}$ can be ignored in the calculation of the received electric power $P_{RX}$.

It should be noted that, in a case in which the second dump current $I_{DUMP2}$ is generated by means of a high-precision current source, $P_{DUMP2}$ can be calculated with high precision. Accordingly, in this case, the second dump current $I_{DUMP2}$ may continue to sink even after the completion of the startup operation of the power supply circuit 308.

The present invention encompasses various arrangements derived with reference to the block diagram in FIG. 2 and based on the aforementioned description. The present invention is by no means restricted to a specific configuration. Description will be made below regarding specific examples.

Figure 3:
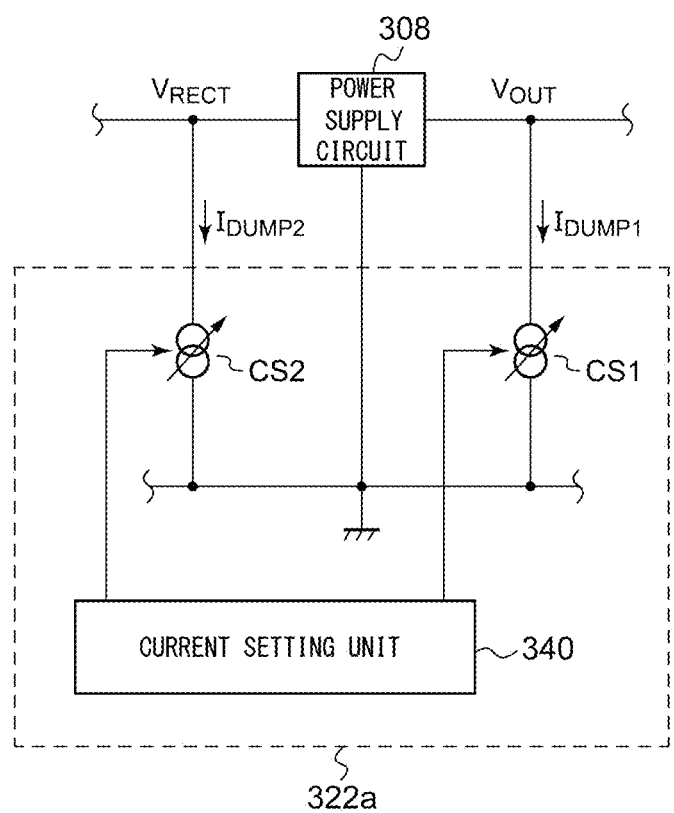
FIG. 3 is a circuit diagram showing an example configuration of a dump circuit.

FIG. 3 is a circuit diagram showing an example configuration of the dump circuit 322. A dump circuit 322a shown in FIG. 3 includes a first current source CS1, a second current source CS2, and a current setting unit 340. The first current source CS1 and the second current source CS2 are each configured as a variable current source. The first current source CS1 and the second current source CS2 are respectively coupled to the output and the input of the power supply circuit 308, and respectively generate the first dump current $I_{DUMP1}$ and the second dump current $I_{DUMP2}$. The current setting unit 340 controls the first current source CS1 and the second current source CS2 according to the detection result regarding the current $I_{OUT}$ detected by the current detection circuit 324 and the startup state of the power supply circuit 308. For example, the current setting unit 340 may set the dump current $I_{DUMP}$ based on the detection value S11 of the current $I_{OUT}$. Also, the current setting unit 340 may switch the dump current path between the path of the first current source CS1 and the path of the second current source CS2 according to the startup state of the power supply circuit 308.

By generating the dump current $I_{DUMP}$ using such a current source, this arrangement is capable of generating the dump current $I_{DUMP}$ with improved precision as compared with the arrangement in which the dump current is generated using the dump resistor as shown in FIG. 1. Furthermore, in a case in which such a dump resistor is employed, it is difficult to change the resistance value of the dump resistor (i.e., dump current) continuously or in a stepwise manner according to the current $I_{OUT}$. In contrast, by employing such a current source, this arrangement is capable of changing the dump current $I_{DUMP}$ continuously or otherwise in a stepwise manner.

Figure 4:
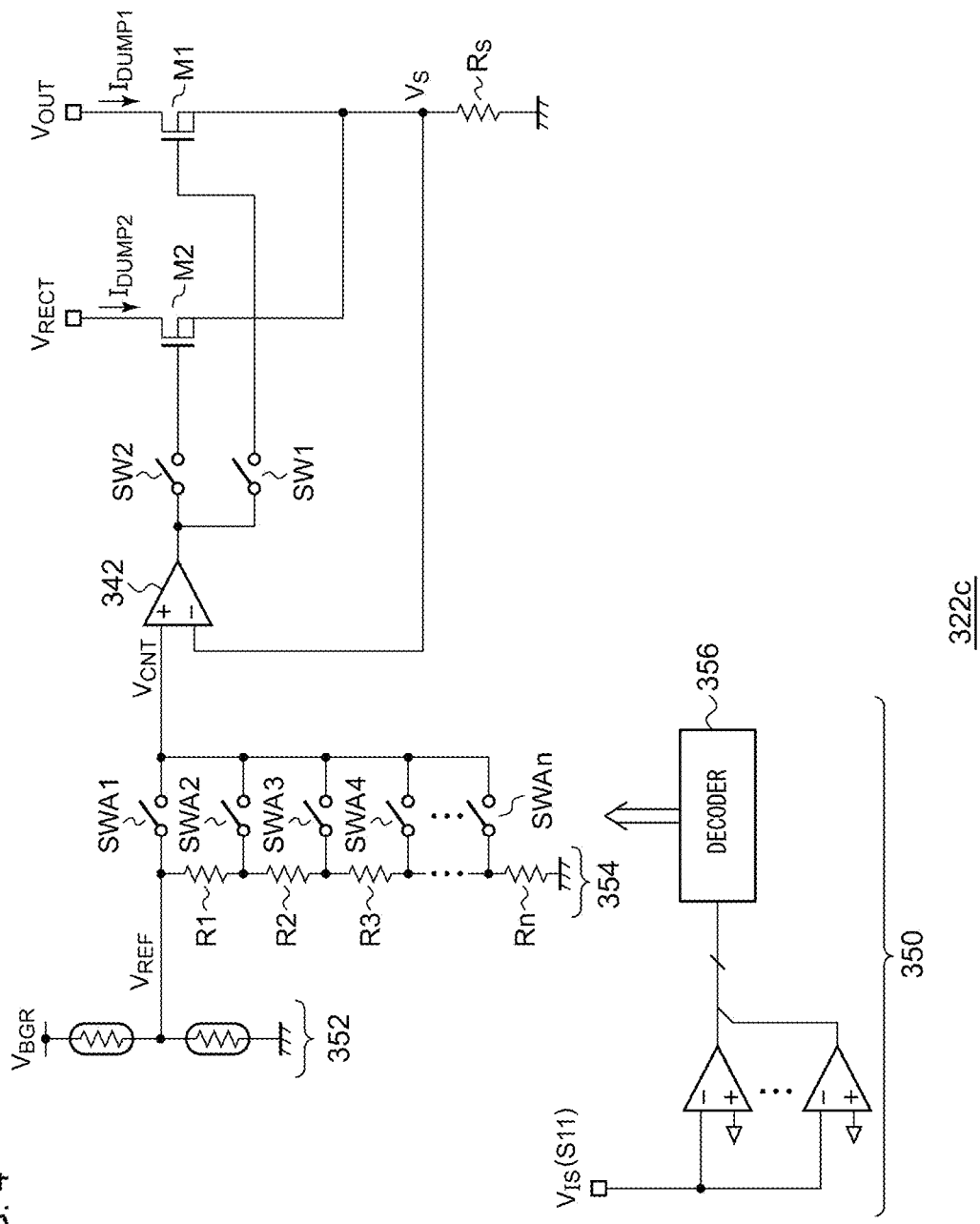
FIG. 4 is a circuit diagram showing an example configuration of a dump circuit.

FIG. 4 is a circuit diagram showing an example configuration of a dump circuit 322c. The dump circuit 322c can be regarded as an example of the dump circuit 322a shown in FIG. 3.

The dump circuit 322c includes a first transistor M1, a second transistor M2, a feedback resistor $R_S$, an error amplifier 342, a first switch SW1, a second switch SW2, and a variable voltage source 350.

The first transistor M1 and the second transistor M2 are each configured as an N-channel MOSFET. A first terminal (drain) of the first transistor M1 is coupled to the output of the power supply circuit 308. The first transistor M1 is arranged on a path of the first dump current $I_{DUMP1}$. The feedback resistor $R_S$ is arranged between a second terminal (source) of the first transistor M1 and the ground. A first terminal (drain) of the second transistor M2 is coupled to the input of the power supply circuit 308. A second terminal (source) of the second transistor M2 is coupled to the feedback resistor $R_S$. A voltage drop (feedback voltage) $V_S$ occurs across the feedback resistor $R_S$ in proportion to the sum total of the first dump current $I_{DUMP1}$ and the second dump current $I_{DUMP2}$.

The error amplifier 342 amplifies the difference between the voltage drop $V_S$ that occurs across the feedback resistor $R_S$ and the control voltage $V_{CNT}$. The voltages $V_{G1}$ and $V_{G2}$ respectively applied to the control terminals (gates) of the first transistor M1 and the second transistor M2 are adjusted such that the difference becomes zero, i.e., such that the voltage drop $V_S$ approaches the control voltage $V_{CNT}$.

With this arrangement, the sum total of the two dump currents $I_{DUMP1}$ and $I_{DUMP2}$ is stabilized to the target level $I_{REF}$ represented by $V_{CNT}/R_S$. The first transistor M1 and the second transistor M2 may each be configured as a P-channel MOSFET or otherwise a bipolar transistor.

The first switch SW1 is arranged between the control terminal of the first transistor M1 and the output of the error amplifier 342. The second switch SW2 is arranged between the control terminal of the second transistor M2 and the output of the error amplifier 342. The first switch SW1 and the second switch SW2 are arranged in order to switch the dump current between $I_{DUMP1}$ and $I_{DUMP2}$. That is to say, when the first switch SW1 is turned on, the first dump current $I_{DUMP1}$ flows. When the second switch SW2 is turned on, the second dump current $I_{DUMP2}$ flows. In the present embodiment, the first switch SW1 and the second switch SW2 are turned on in an exclusive manner. Also, a modification may be made in which the first switch SW1 and the second switch SW2 are turned on at the same time.

The variable voltage source 350 generates the control voltage $V_{CNT}$ according to the current detection signal S11 ($V_{IS}$). Specifically, as the amount of current indicated by the current detection signal S11 becomes smaller, the variable voltage source 350 raises the control voltage $V_{CNT}$ so as to increase the dump current $I_{DUMP}$.

A constant voltage source 352 generates a reference voltage $V_{REF}$. A voltage dividing circuit 354 includes n (n represents an integer of 2 or more) multiple resistors R1 through Rn coupled in series between the output of the constant voltage source 352 and the ground. The multiple switches SWA1 through SWAn are arranged between multiple respective taps each provided to the voltage dividing circuit 354 and the input terminal (+) of the error amplifier 342. A decoder 356 controls the multiple switches SWA1 through SWAn according to the current detection signal S11. The constant voltage source 352, the voltage dividing circuit 354, the switches SWA1 through SWAn, and the decoder 356 can be regarded as a D/A converter.

The current detection signal S11 may be configured as an analog voltage $V_{IS}$ that indicates the amount of the current $I_{OUT}$ that flows through the power supply circuit 308. In this case, the variable voltage source 350 includes multiple comparators CMP1 through CMPm. Here, m represents an integer of 2 or more. The current $I_{OUT}$ in a given range is converted into a digital value by means of the multiple comparators CMP1 through CMPm. The decoder 356 controls the switches SWA1 through SWAn according to the range of the current $I_{OUT}$.

The constant voltage source 352 may include repair resistors R11 and R12 to be used to adjust the constant voltage $V_{REF}$ in the manufacturing step. The repair resistors R11 and R12 divide a constant voltage $V_{BGR}$ supplied from an unshown bandgap reference circuit, so as to generate the reference voltage $V_{REF}$.

In the manufacturing step, the first switch SW1 and the switch SWA1 are turned on, for example. Before the repair step, $V_{REF}$ is set to the initial value $V_{REF0}$. In this case, the relation $V_{CNT}=V_{REF0}$ holds true. Accordingly, the dump current $I_{DUMP1}$ is represented by the following Expression.

$$I_{DUMP1}=V_{REF0}/R_S$$

Variation in the resistance value of the feedback voltage $R_S$ leads to variation in $I_{DUMP1}$. In order to solve such a problem, the resistance values of the repair resistors R11 and R12 are repaired while measuring $I_{DUMP1}$ such that the measurement value becomes the design value. This allows the dump currents $I_{DUMP1}$ and $I_{DUMP2}$ to be generated with high precision even in a case in which there is variation in the elements.

Figure 5:
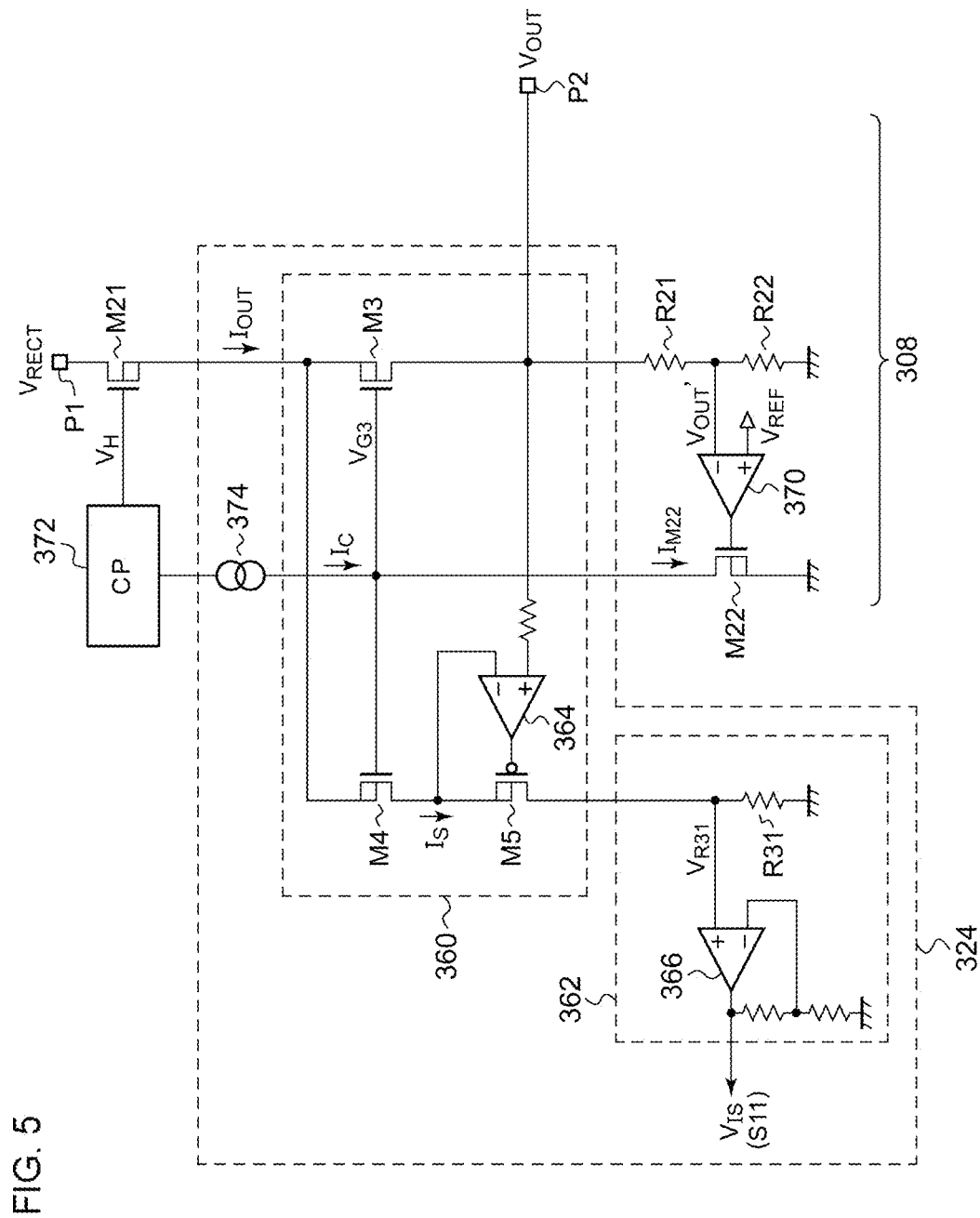
FIG. 5 is a circuit diagram showing a current detection circuit that generates a current detection signal.

FIG. 5 is a circuit diagram showing a current detection circuit 324 that generates the current detection signal S11. FIG. 5 shows the power supply circuit 308 together with the current detection circuit 324. The power supply circuit 308 shown in FIG. 5 is configured as a linear regulator, and mainly includes output transistors M21 and M3, an error amplifier 370, a transistor M22, resistors R21 and R22, a charge pump circuit 372, and a current source 374. The output transistors M21 and M3 are arranged between the input terminal P1 and the output terminal P2 of the power supply circuit 308. The back gate of the output transistor M21 is coupled to the source thereof. The back gate of the output transistor M3 is coupled to the drain thereof. The charge pump circuit 372 supplies the voltage $V_H$ that is higher than the voltage $V_{RECT}$ to the gate of the output transistor M21. The current source 374 supplies a constant current $I_C$ to the gate of the output transistor M3. Instead of the current source 374, a resistor may be arranged between the output of the charge pump circuit 372 and the gate of the transistor M3. The output voltage $V_{OUT}$ is divided by means of the resistors R21 and R22. The error amplifier 370 amplifies the difference between the output voltage $V_{OUT}'$ thus divided and the reference voltage $V_{REF}$. The transistor M22 is arranged between the gate of the output transistor M3 and the ground. The output of the error amplifier 370 is supplied to the gate of the transistor M22. With this arrangement, the amount of drain current $I_{M22}$ of the transistor M22 is controlled such that the output voltage $V_{OUT}'$ matches the reference voltage $V_{REF}$, thereby adjusting the voltage applied to the control terminal (gate) of the output transistor M3. With this arrangement, the output voltage $V_{OUT}$ is stabilized to the following voltage level.

$$V_{OUT}=V_{REF}\times(1+R21/R22)$$

The current detection circuit 324 includes a current mirror circuit 360 and a current/voltage (I/V) converter 362. The current mirror circuit 360 includes a third transistor M3 arranged on a path of the current $I_{OUT}$ of the power supply circuit 308 to be detected and a fourth transistor M4 arranged such that its control terminal (gate) is coupled to the control terminal (gate) of the third transistor M3 so as to form a common control terminal (gate). The third transistor M3 also serves as an output transistor of the power supply circuit 308. A detection current $I_S$ flows through the fourth transistor M4 in proportion to the current $I_{OUT}$ that flows through the third transistor M3 to be detected.

The current mirror circuit 360 further includes a fifth transistor M5 and an error amplifier 364. The error amplifier 364 receives the drain voltage of the third transistor M3 (i.e., output voltage $V_{OUT}$) and the drain voltage of the fourth transistor M4, and controls the gate voltage of the fifth transistor M5 such that the drain voltage of the fourth transistor M4 matches the output voltage $V_{OUT}$. With this arrangement, the gate voltage, the drain voltage, and the source voltage of the third transistor M3 respectively match those of the fourth transistor M4. This arrangement provides the ratio between the detection current $I_S$ and the output current $I_{OUT}$ with improved precision.

The I/V converter 362 converts the detection voltage $I_S$ that flows through the fourth transistor M4 into the voltage $V_{IS}$. The I/V converter 362 includes a conversion resistor R31 arranged on a path of the detection current $I_S$. A voltage drop $V_{R31}$ occurs across the conversion resistor R31 in proportion to the detection current $I_S$, i.e., in proportion to the output current $I_{OUT}$. A buffer (or otherwise amplifier) 366 receives the voltage drop $V_{R31}$, and outputs the voltage drop thus received as the voltage signal $V_{IS}$ that corresponds to the current detection signal S11.

With the current detection circuit 324 shown in FIG. 5, this arrangement is capable of detecting the current $I_{OUT}$ that flows through the power supply circuit 308 with high precision.

Usage

Figure 6:
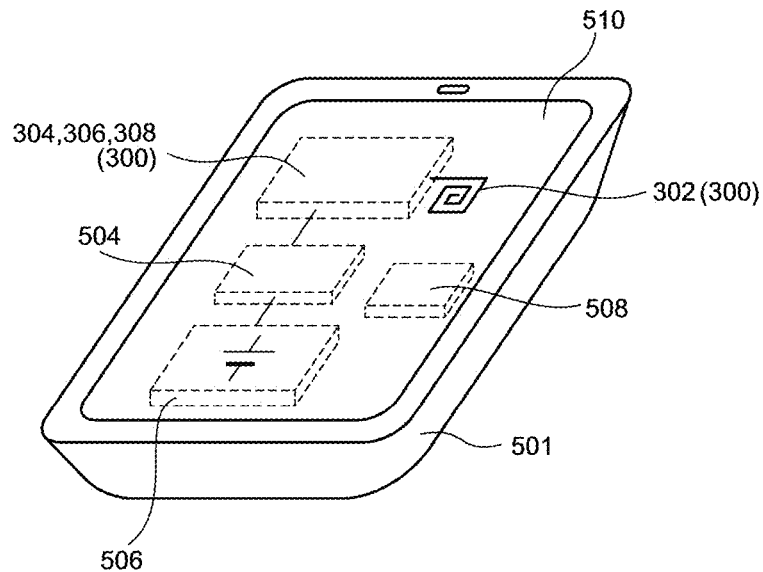
FIG. 6 is a diagram showing an electronic device including a power receiver apparatus according to an embodiment.

Lastly, description will be made regarding an example of an electronic device employing the wireless power receiver apparatus 300 according to an embodiment. FIG. 6 is a diagram showing an electronic device 500 including the power receiver apparatus 300 according to an embodiment. The electronic device 500 shown in FIG. 6 is configured as a smartphone, tablet PC, portable game machine, or portable audio player. A housing 501 includes the power receiver apparatus 300 as a built-in component including the reception coil 302, the rectifier circuit 304, the smoothing capacitor 306, the power supply circuit 308, etc. FIG. 6 shows a charger circuit 504, a secondary battery 506, and other electronic circuits 508, which are each configured as the load 502. The electronic circuit 508 may include a wireless (RF) unit, baseband processor, application processor, audio processor, or the like.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Figure 7:
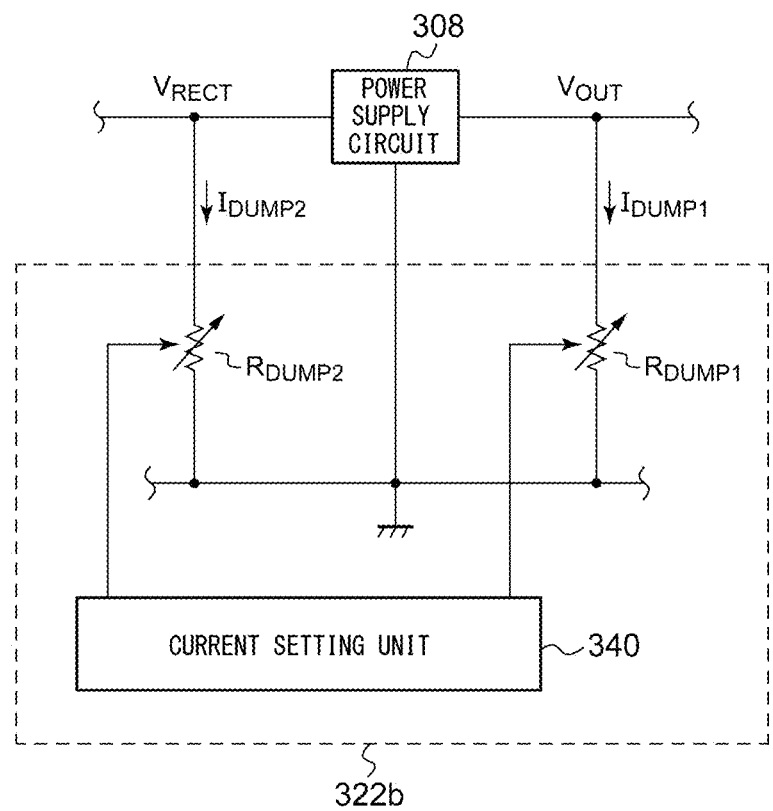
FIG. 7 is a circuit diagram showing a dump circuit according to a modification.

FIG. 7 is a circuit diagram showing a dump circuit 322b according to a modification. The dump circuit 322b includes a first dump resistor $R_{DUMP1}$, a second dump resistor $R_{DUMP2}$, and a current setting unit 340. The first dump resistor $R_{DUMP1}$ is arranged between the output of the power supply circuit 308 and the ground, and sinks the first dump current $I_{DUMP1}$ in inverse proportion to the resistance value of the first dump resistor $R_{DUMP1}$. On the other hand, the second dump resistor $R_{DUMP2}$ is arranged between the input of the power supply circuit 308 and the ground, and sinks the second dump current $I_{DUMP2}$ in inverse proportion to the resistance value of the second dump resistor $R_{DUMP2}$. The first dump resistor $R_{DUMP1}$ and the second dump resistor $R_{DUMP2}$ are each configured as a variable resistor. The current setting unit 340 controls the resistance values of the first dump resistor $R_{DUMP1}$ and the second dump resistor $R_{DUMP2}$ according to the current $I_{OUT}$. In a case in which such a dump resistor $R_{DUMP}$ is employed, this leads to a problem in that the dump current $I_{DUMP}$ is generated with poor precision. However, $I_{DUMP1}$ can be detected with high precision as a part of $I_{OUT}$. Furthermore, by setting $I_{DUMP2}$ to zero after the startup operation of the power supply circuit 308, such an arrangement is not required to measure the dump current $I_{DUMP2}$. Accordingly, the dump circuit 322b can be effectively employed.

Modification 2

Figure 8:
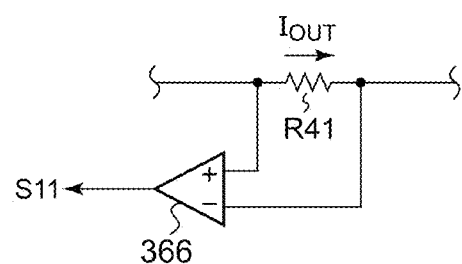
FIG. 8 is a circuit diagram showing a current detection circuit according to a modification.

FIG. 8 is a circuit diagram showing a current detection circuit 324a according to a modification. A current detection resistor R41 is arranged on a path of the current $I_{OUT}$ of the power supply circuit 308 to be detected. A sensing amplifier 366 amplifies a voltage drop $V_{R41}$ that occurs across the current detection resistor R41, so as to generate the current detection signal S11. The power supply circuit 308 may be configured as a linear regulator, a switching regulator, or a charger circuit for a secondary battery.

Alternatively, instead of employing the current detection resistor R41, the on resistance of the output transistor M21 of the power supply circuit may be used. In this case, the current detection signal S11 may be generated based on the drain-source voltage $V_{DS}$ of the output transistor M21.

While the preferred embodiments of the present invention have been described using specific terms, such description is for illustrative purposes only, and it is to be understood that changes and variations may be made without departing from the spirit or scope of the appended claims.

What is claimed is:

1. A wireless power receiver apparatus comprising:
   a reception coil;
   a rectifier circuit structured to rectify a current that flows through the reception coil;
   a smoothing capacitor coupled to an output of the rectifier circuit;
   a power supply circuit structured to receive a rectified voltage across the smoothing capacitor, and to supply a stabilized voltage to a load;
   a dump circuit structured to sink a first dump current from an output of the power supply circuit; and
   a current detection circuit structured to detect a current that flows through the power supply circuit, and to generate a current detection signal that indicates an amount of the current thus detected,
   wherein the dump circuit is structured to allow a second dump current to sink from an input of the power supply circuit in addition to the first dump current,
   wherein the dump circuit sinks the second dump current before completion of a startup operation of the power supply circuit, and
   wherein the dump circuit sinks the first dump current after the completion of the startup operation of the power supply circuit.

2. The wireless power receiver apparatus according to claim 1, further comprising an electric power measurement unit structured to calculate a received electric power based on at least the current detection signal.

3. The wireless power receiver apparatus according to claim 1, further comprising:
   a target voltage setting unit structured to control a target value of the rectified voltage based on the current detection signal;
   an electric power control unit structured to generate electric power control data having a value that is adjusted such that the rectified voltage approaches the target value; and
   a modulator structured to modulate the electric power control data, and to supply the electric power control data thus modulated to a wireless power transmitter apparatus via the reception coil.

4. The wireless power receiver apparatus according to claim 1; wherein the dump circuit raises the first dump current according to a reduction in the current that flows through the power supply circuit.

5. The wireless power receiver apparatus according to claim 1, wherein the dump circuit comprises a first current source coupled to the output of the power supply circuit and structured to generate the first dump current.

6. The wireless power receiver apparatus according to claim 1, wherein the dump circuit comprises a second current source coupled to the input of the power supply circuit and structured to generate the second dump current.

7. A wireless power receiver apparatus comprising:
a reception coil;
a rectifier circuit structured to rectify a current that flows through the reception coil;
a smoothing capacitor coupled to an output of the rectifier circuit;
a power supply circuit structured to receive a rectified voltage across the smoothing capacitor, and to supply a stabilized voltage to a load;
a dump circuit structured to sink a first dump current from an output of the power supply circuit; and
a current detection circuit structured to detect a current that flows through the power supply circuit, and to generate a current detection signal that indicates an amount of the current thus detected,
wherein the dump circuit is structured to allow a second dump current to sink from an input of the power supply circuit in addition to the first dump current, and
wherein the dump circuit comprises:
a first transistor arranged such that a first terminal thereof is coupled to the output of the power supply circuit;
a feedback resistor arranged between a second terminal of the first transistor and a ground;
a second transistor arranged such that a first terminal thereof is coupled to the input of the power supply circuit and a second terminal thereof is coupled to the feedback resistor; and
an error amplifier structured to adjust voltages applied to control terminals of the first transistor and the second transistor.

8. The wireless power receiver apparatus according to claim 7, wherein the dump circuit further comprises:
a first switch arranged between the control terminal of the first transistor and the error amplifier; and
a second switch arranged between the control terminal of the second transistor and the error amplifier.

9. The wireless power receiver apparatus according to claim 7, wherein the dump circuit further comprises a variable voltage source structured to generate the control voltage according to the current detection signal.

10. The wireless power receiver apparatus according to claim 9, wherein the variable voltage source comprises:
a constant voltage source structured to generate a constant voltage;
a voltage dividing circuit comprising a plurality of resistors coupled in series between an output of the constant voltage source and the ground;
a plurality of switches respectively arranged between a plurality of taps provided to the voltage dividing circuit and an input terminal of the error amplifier; and
a decoder structured to control the plurality of switches according to the current detection signal.

11. The wireless power receiver apparatus according to claim 10, wherein the constant voltage source comprises a repair resistor structured to allow the constant voltage to be adjusted in a manufacturing step.

12. A wireless power receiver apparatus comprising:
a reception coil;
a rectifier circuit structured to rectify a current that flows through the reception coil;
a smoothing capacitor coupled to an output of the rectifier circuit;
a power supply circuit structured to receive a rectified voltage across the smoothing capacitor, and to supply a stabilized voltage to a load;
a dump circuit structured to sink a first dump current from an output of the power supply circuit; and
a current detection circuit structured to detect a current that flows through the power supply circuit, and to generate a current detection signal that indicates an amount of the current thus detected,
wherein the current detection circuit comprises:
a current mirror circuit comprising a third transistor arranged on a path of a current of the power supply circuit to be detected and a fourth transistor arranged such that a control terminal thereof is coupled to a control terminal of the third transistor so as to form a common control terminal; and
an I/V converter circuit structured to convert a current that flows through the fourth transistor into a voltage.

13. The wireless power receiver apparatus according to claim 1, wherein the current detection circuit comprises:
a current detection resistor arranged on a path of a current of the power supply circuit to be detected; and
a sensing amplifier structured to generate the current detection signal that corresponds to a voltage drop that occurs across the current detection resistor.

14. The wireless power receiver apparatus according to claim 1, wherein the dump circuit comprises a first dump resistor arranged between the output of the power supply circuit and the ground,
and wherein the dump circuit is structured to sink the first dump current in inverse proportion to a resistance value of the first dump resistor.

15. The wireless power receiver apparatus according to claim 1, wherein the dump circuit comprises a second dump resistor arranged between the input of the power supply circuit and the ground,
and wherein the dump circuit is structured to sink the second dump current in inverse proportion to a resistance value of the second dump resistor.

* * * * *